Patented Aug. 8, 1939

2,168,534

UNITED STATES PATENT OFFICE 2,168,534

PROCESS OF WATERPROOFING TEXTILE MATERIAL AND THE MATERIAL THUS OBTAINED

Joseph Nuesslein and Georg von Finck, Frankfort-on-the-Main, and Hermann Stärk, Bad Soden in Taunus, Germany, assignors to I. G. Farbenindustrie Aktiengesellschaft, Frankfort-on-the-Main, Germany No Drawing. Application April 28, 1937, Serial No. 139,480. In Germany April 29, 1936

11 Claims. (Cl. 91—68)

In the copending applications Ser. Nos. 94,482, 118,678 and 127,310, filed August 5, 1936, December 31, 1936, and February 23, 1937, respectively, for "Water-repellent textile material and process of manufacturing it," in the name of Arthur Voss et al., it has been shown that textile materials may be rendered water-proof the waterproofing being stable to washing by application of mixed polymerizates from maleic acid or its derivatives and olefinic compounds in which at least one of the components contains an aliphatic residue of at least 10 carbon atoms.

There may be used, for instance, the following products: the mixed polymerizate from maleic anhydride and vinyl-octadecyl ether; the mixed polymerizate from maleic acid monomethyl ester and stearic acid vinyl ester; the mixed polymerizate from maleic acid and vinyl-octodecyl ether; the mixed polymerizate from maleic acid mono-dodecyl ester and vinyl-dodecyl ether. Furthermore, there may be used maleic anhydride in combination with vinyl stearate or vinyl palmitate. Instead of the above-mentioned vinyl-octodecyl ether there may also be used the vinyl ether of the alcohol mixture formed by the reduction of coconut oil fatty acids and containing, for the main part, compounds with 12 to 14 carbon atoms, or the vinyl ether of the montan wax alcohol. Another mixed polymerizate suitable for use may be obtained from maleic anhydride and isohexadecylene. Instead of the maleic anhydride there may also be used the free maleic acid and its mono- or di-esters derived from aliphatic alcohols. These aliphatic alcohols may be of low or of high molecular weight. If the maleic acid ester contains a radical of high molecular weight, it is not always necessary that the vinyl compound used for preparing the mixed polymerizate should be of high molecular weight. Thus, there may be used as mixed polymerizates in some cases compounds such as vinyl acetate, vinyl chloride, etc., together with maleic acid esters of high molecular weight. Furthermore, maleic acid di-hexadecyl ester, for instance, may be used in combination with methacrylic acid methyl-ester, vinyl-ethyl ether or vinyl-methyl ether. There may also be used other derivatives of maleic acid, such as the nitrile or the acid amide. The mixed polymerizates are, therefore, derived from maleic acid anhydride or compounds of the formula:

wherein $R_1$ and $R_2$ represent members of the group consisting of COOH, COOalkyl, CN, CONH$_2$, and other polymerizable olefinic compounds.

Now, we have found that various hydrocarbons and hydrocarbon derivatives which contain at least 10 carbon atoms in the molecule and have a more or less good waterproofing effect on textiles impregnated with them are much improved in this respect by even a small addition of one of the mixed polymerizates defined above, and the effect of this addition is to produce a product which in its water-proofing effect exceeds that of both the mixed polymerizate alone and of the hydrocarbon or hydrocarbon derivative alone.

For instance, 10 grams of stearic acid dissolved in 1000 cc. of carbon tetrachloride is of little use as a water-proofing agent for artificial silk. When, however, about 1 gram of one of the aforesaid mixed polymerizates is added to this stearic acid solution, there is obtained a liquid which has a water-proofing effect upon artificial silk which is essentially better than that of the solution containing 10 grams or more of stearic acid alone or a solution containing 1 gram or more of the mixed polymerizate alone.

Also the water-proofing effect of other products is essentially improved by addition of the mixed polymerizate. We name, for instance, fatty alcohols of high molecular weight, their ethers, fatty acids of high molecular weight, their esters, anhydrides, amides, methylolamides, iso-cyanates and paraffins or mixtures of these products. There may be mentioned, for instance: stearic anhydride, stearyl-alcohol, dodecyl-alcohol, stearyl-isocyanate, montanic acid methylol-amide, stearic acid methylol-amide, stearyl-hydroxy-methyl-pyridinium chloride, lauric acid amide, palmitic acid amide etc. Moreover, chlorine substitution products of these compounds are useful. A further increase of the effect may be produced by simultaneous use of aluminium salts.

It is remarkable that impregnation with these bodies also lends a considerably enhanced stability towards washing with soap and towards treatment with organic solvents. Thus after one or more cleaning operations an article of clothing or other textile material will retain the waterproof properties imparted to it by the treatment of this invention.

For making an impregnating liquor, there may be used not only solvents which are liquid at room temperature, like benzene, methylene-chloride or the like, but also solvents which are only liquid at a raised temperature. Thus, for example, it is possible to dissolve one of the mixed polymerizates in paraffin melting at 52° C., then to emulsify this paraffin in known manner in water and to impregnate the material with this emulsion. During the following drying in a drying oven in which the temperature is advantageously maintained above the melting point of the paraffin the latter acts simultaneously as the solvent and there is obtained a water-proof impregnation which is fast to washing.

The treatment with all the aforesaid substances may be simultaneous or successive. For instance, the material may be impregnated with a solution of one of the above-mentioned mixed polymerizates in carbon tetrachloride and then after evaporation of the solvent, an aqueous solution of, for instance, stearyl-hydroxy-methyl-pyridinium chloride and finally dried. It is also possible to impregnate the material, in one bath consisting of a solution in carbon tetrachloride, of the mixed polymerizate from maleic anhydride and vinyl-dodecyl ether or another of the indicated mixed polymerizates together with, for instance, stearyl-iso-cyanate. It is likewise possible to treat the textile fibers with one of the above-mentioned aliphatic compounds before treating them with one of the mixed polymerizates. After being impregnated, the fibrous material must be dried at a more or less elevated temperature, which is determined by the properties of the fatty compound used.

The following examples serve to illustrate the invention, but they are not intended to limit it thereto; the parts are by weight:

1. Artificial silk crepe is treated for five minutes in a solution which contains per liter of methylene-chloride 10 grams of paraffin melting at 52° C. and 1 gram of the mixed polymerizate from maleic acid monomethylester and vinyldodecylether or vinyloctadecylether; it is then squeezed or centrifuged and suspended in air to evaporate the solvent.

2. A cotton fabric is pre-treated with 5 grams of lactic acid in a liter of water, then dried and impregnated for 5 minutes with a solution which contains per liter of carbon tetrachloride 10 grams of stearic acid methylolamide (made by treating stearic acid amide with concentrated formaldehyde solution) and 1 gram of a mixed polymerizate from maleic acid anhydride and vinyl-octadecylether; it is then squeezed or centrifuged, and after evaporation of the solvent it is heated in a drying chest for 20 minutes at 140° C.

3. 1 part of the mixed polymerizate from the maleic acid monomethylester and vinyl-stearate is melted together with 10 parts of hard paraffin and the mass is emulsified with water (for instance by stirring it in a solution of glue and soap). In such an emulsion, containing per liter about 20 grams of the aforesaid mass, there is treated for 15-20 minutes a material of wool, cotton, artificial silk or mixed fibers, and the material is then centrifuged, dried and impregnated with an aqueous solution of aluminium formate (1 gram of $Al_2O_3$ per liter of liquid) and finally dried.

4. Artificial silk material is treated by the known process with aluminium formate or aluminium acetate in an aqueous solution, dried and after-treated by the procedure described in Example 1.

5. Woolen, silk or artificial silk clothing material is treated for 5 minutes in a solution which contains per liter of carbon tetrachloride 10 grams of stearyl-isocyanate and 1 gram of a mixed polymerizate of maleic acid octadecylester and vinyl-octadecylether; it is then squeezed or centrifuged, and after evaporation of the solvent heated in a drying chest for 20 minutes at 100° C.

By this treatment there are obtained goods having a water-repelling effect which is not lost after several washings with soap and sodium carbonate or benzine.

The polymerizates may be made as indicated in U. S. Patent No. 2,047,398.

6. A cotton or artificial silk fabric is treated for 5 minutes in a solution consisting of

| | Parts |
|---|---|
| Benzine | 530 |
| Ethyl-alcohol | 270 |
| A mixed polymerizate from maleic acid and vinyl-tetradecylether | 5 |
| Dodecyl-isocyanate | 5 | then squeezed or centrifuged and heated, after evaporation of the solvent, in a drying chest for 20 minutes at 100° C.

7. Woolen, silk or artificial silk clothing material is treated for 5 minutes in a solution which contains per liter of carbon tetrachloride 5 grams of the mixed polymerizate from maleic acid monododecylester and vinyldodecylether and dried in the air. After evaporation of the solvent, the material is introduced into a second bath containing per liter of water 10 grams of stearyl-hydroxy-methyl-pyridinium chloride. The material is subsequently squeezed and dried for about 1 hour at 80° C.–100° C.; it is then washed in another aqueous solution containing per liter 5 grams of soap and 2 grams of sodium carbonate, rinsed and dried.

8. Cotton or artificial silk clothing material is treated for 5 minutes in a solution which contains per liter of benzine 10 grams of stearic anhydride and 1 gram of the mixed polymerizate from maleic acid ditetradecylester and vinyl-tetradecylether, squeezed and heated, after evaporation of the solvent, in a drying chest for about half an hour at 110° C.

9. Cotton or artificial silk clothing material is treated in a solution which contains per liter of water 10 grams of the pyridinium salt of the mixed polymerizate from maleic acid and vinyl-stearic acid ester, dried and heated for 15 minutes at 110° C.; the material is then treated for a short time in a second bath containing per liter of water 10 grams of stearyl-hydroxy-methyl-pyridinium chloride and dried at 80° C.–90° C.

10. A cotton fabric is pretreated with a solution containing per liter of water 5 grams of lactic acid, dried and impregnated, for 5 minutes, in a solution which contains per liter of carbon tetrachloride 10 grams of stearic acid methylol-amide (preparable by the action of a concentrated formaldehyde solution or stearic acid amide) and 1 gram of a mixed polymerizate from maleic acid octodecylester and vinylethylether; it is then squeezed or centrifuged and heated, after evaporation of the solvent, in a drying chest for 20 minutes at 140° C.

We claim:

1. The process of water-proofing textile materials which comprises treating textile materials with mixed polymerizates containing at least one aliphatic radical with at least 10 carbon atoms being composed of a compound selected from the group consisting of maleic anhydride and compounds of the formula

$R_1$ and $R_2$ standing for members of the group consisting of COOH, COO.alkyl, CN, CONH$_2$, and of olefinic compounds capable of being polymerized, and with a compound containing at least 10 carbon atoms selected from the group consisting of aliphatic hydrocarbons, aliphatic alcohols and ethers, aliphatic carboxylic acids, their esters, anhydrides, amides, methylol amides and iso-cyanates, and halogen derivatives of the said compounds and drying said textile materials whereby water-proofing thereof results, the water-proofing being due to the conjoint action of said mixed polymerizates and said compound containing at least 10 carbon atoms.

2. The process of water-proofing textile materials which comprises treating textile materials with solutions of aluminium and with mixed polymerizates containing at least one aliphatic radical of at least 10 carbon atoms being composed of a compound selected from the group consisting of maleic anhydride and compounds of the formula:

$R_1$ and $R_2$ standing for members of the group consisting of COOH, COO.alkyl, CN, CONH$_2$, and of olefinic compounds capable of being polymerized, and with a compound containing at least 10 carbon atoms selected from the group consisting of aliphatic hydrocarbons, aliphatic alcohols and ethers, aliphatic carboxylic acids, their esters, anhydrides, amides, methylol amides and iso-cyanates, and halongen derivatives of the said compounds and drying said textile materials whereby water-proofing results, the water-proofing being due to the conjoint action of said mixed polymerizates and said compound containing at least 10 carbon atoms supplemented by the action of said aluminium salts.

3. The process of water-proofing textile materials which comprises treating textile materials with mixed polymerizates containing at least one aliphatic radical with at least 10 carbon atoms being composed of a compound selected from the group consisting of maleic anhydride and of compounds of the formula:

$R_1$ and $R_2$ standing for members of the group consisting of COOH, COO.alkyl, CN, CONH$_2$, and of a compound of the formula H$_2$C—CHX, wherein X stands for a member selected from the group consisting of R, OR, RCOO, R being an aliphatic hydrocarbon radical, and with a compound containing at least 10 carbon atoms selected from the group consisting of aliphatic hydrocarbons, aliphatic alcohols and ethers, aliphatic carboxylic acids, their esters, anhydrides, amides, methylol amides, and iso-cyanates, and halogen derivatives of the said compounds and drying said textile materials whereby water-proofing thereof results, the water-proofing being due to the conjoint action of said mixed polymerizates and said compound containing at least 10 carbon atoms.

4. The process of water-proofing textile materials which comprises treating textile materials with mixed polymerizates containing at least one aliphatic radical with at least 10 carbon atoms being composed of maleic anhydride and of a compound of the formula H$_2$C—CHX, wherein X stands for a member of the group consisting of R, OR, RCOO, R being an aliphatic hydrocarbon radical, and with a compound containing at least 10 carbon atoms selected from the group consisting of aliphatic hydrocarbons, aliphatic alcohols and ethers, aliphatic carboxylic acids, their esters, anhydrides, amides, methylol amides and iso-cyanates, and halogen derivatives of the said compounds and drying said textile materials whereby water-proofing thereof results, the water-proofing being due to the conjoint action of said mixed polymerizates and said compound containing at least 10 carbon atoms.

5. The process of water-proofing textile materials which comprises treating textile materials with a mixed polymerizate being composed of maleic anhydride and of vinyl-octodecyl-ether and with a compound containing at least 10 carbon atoms selected from the group consisting of aliphatic hydrocarbons, aliphatic alcohols and ethers, aliphatic carboxylic acids, their esters, anhydrides, amides, methylol amides and iso-cyanates, and halogen derivatives of the said compounds and drying said textile materials whereby water-proofing thereof results, the water-proofing being due to the conjoint action of said mixed polymerizates and said compound containing at least 10 carbon atoms.

6. The process of water-proofing textile materials which comprises treating textile materials with a mixed polymerizate being composed of maleic anhydride and vinyl-octodecyl ether, and with stearic acid methylol amide.

7. The process of water-proofing textile materials which comprises treating textile materials with a mixed polymerizate being composed of maleic acid anhydride and vinyl octodecyl ether and with stearyl-iso-cyanate.

8. Water-proof textile material, which has been treated with mixed polymerizates containing at least one aliphatic radical of at least 10 carbon atoms being composed of a compound selected from the group consisting of maleic anhydride and of compounds of the formula:

$R_1$ and $R_2$ standing for members of the group consisting of COOH, COO.alkyl, CN, CONH$_2$, and of olefinic compounds capable of being polymerized, and with a compound containing at least 10 carbon atoms selected from the group consisting of aliphatic hydrocarbons, aliphatic alcohols and ethers, aliphatic carboxylic acids, their esters, anhydrides, amides, methylol amides and iso-cyanates, and halogen derivatives of the said compounds the water-proofed character of said textile material being caused by the conjoint action of said mixed polymerizates and said compound containing at least 10 carbon atoms carried by said material.

9. Water-proof textile material, which has been treated, with solutions of aluminium salts and with mixed polymerizates containing at least one aliphatic radical with at least 10 carbon atoms being composed of a compound selected from the group consisting of maleic anhydride and of compounds of the formula:

$R_1$ and $R_2$ standing for members of the group consisting of COOH, COO.alkyl, CN, CONH$_2$, and of olefinic compounds capable of being polymerized and with a compound containing at least 10 carbon atoms selected from the group consisting of aliphatic hydrocarbons, aliphatic alcohols and ethers, aliphatic carboxylic acids, their esters, anhydrides, amides, methylol amides and iso-cyanates, and halogen derivatives of the said compounds the water-proof character of said textile material being caused by the conjoint action of said mixed polymerizates and said compound containing at least 10 carbon atoms supplemented by the action of said aluminium salts carried by said material.

10. Water-proof textile material, which has been treated with a mixed polymerizate being composed of maleic anhydride and vinyl-octodecyl ether and with stearic acid methylol amide.

11. Water-proof textile material, which has been treated with a mixed polymerizate being composed of maleic anhydride and vinyl-octodecyl ether and with stearyl-iso-cyanate.

JOSEPH NUESSLEIN.
GEORG von FINCK.
HERMANN STÄRK.